(12) United States Patent
Fernandes et al.

(10) Patent No.: US 12,038,346 B2
(45) Date of Patent: Jul. 16, 2024

(54) TECHNIQUES FOR PROVIDING A SWEPT WAVELENGTH (SW) MEASUREMENT FOR ACQUIRING POLARIZATION DEPENDENT LOSS (PDL) IN A SINGLE SCAN

(71) Applicant: VIAVI SOLUTIONS INC., San Jose, CA (US)

(72) Inventors: Luis Andre Neves Paiva Fernandes, Ottawa (CA); Robert Matthew Adams, Ottawa (CA); Christopher Russell Wagner, Kanata (CA); Joshua Benjamin Julius Philipson, Ottawa (CA); Eugene Chan, Ottawa (CA)

(73) Assignee: VIAVI SOLUTIONS INC., Chandler, AZ (US)

( * ) Notice: Subject to any disclaimer, the term of this patent is extended or adjusted under 35 U.S.C. 154(b) by 176 days.

(21) Appl. No.: 17/341,261

(22) Filed: Jun. 7, 2021

(65) Prior Publication Data
US 2022/0390322 A1 Dec. 8, 2022

(51) Int. Cl.
*G01M 11/00* (2006.01)
*G02F 1/01* (2006.01)

(52) U.S. Cl.
CPC ......... *G01M 11/337* (2013.01); *G02F 1/0139* (2021.01)

(58) Field of Classification Search
CPC ............. G01M 11/337; G01M 11/336; G01M 11/335; G01M 11/338; G02F 1/0139; G02F 1/0136; G02F 1/0134; G02F 1/095; G02F 1/0115; G01N 21/21; G01N 21/23; G01N 2201/08; G02B 6/2713; G02B 27/28; G02B 6/2766; G02B 6/274; G02B 6/105;
(Continued)

(56) References Cited

U.S. PATENT DOCUMENTS

| | | | |
|---|---|---|---|
| 5,386,484 A * | 1/1995 | Ooka | G02B 6/4457 385/11 |
| 5,481,391 A * | 1/1996 | Giles | H01S 3/06754 359/347 |

(Continued)

FOREIGN PATENT DOCUMENTS

| | | | | |
|---|---|---|---|---|
| AU | 2015201039 A1 * | 3/2015 | | G01B 9/02004 |
| CA | 2740880 A1 * | 4/2010 | | H01S 3/06791 |
| GB | 2267405 A * | 12/1993 | | H04B 10/25 |

*Primary Examiner* — Mohamed K Amara
(74) *Attorney, Agent, or Firm* — Mannava & Kang, P.C.

(57) ABSTRACT

According to examples, a system for measuring polarization dependent loss (PDL) for a device-under-test (DUT) may include a tunable laser, a polarization element and a power meter. The tunable laser may emit an optical signal to sweep across an optical band at a constant rate. The polarization element may scramble polarizations states of the optical signal emitted from the tunable laser. The power meter may take power measurements associated with the optical signal emitted from the tunable laser, wherein the power measurements from the power meter are used to determine a maximum insertion loss (IL) and a minimum insertion loss (IL) associated with the device-under-test (DUT). An average insertion loss (IL) and a polarization dependent loss (PDL) for the device-under-test (DUT) may be calculated based on the maximum insertion loss (IL) and the minimum insertion loss (IL) associated with the device-under-test (DUT).

20 Claims, 12 Drawing Sheets

(58) Field of Classification Search
CPC ... G02B 6/2786; G01J 4/00; G01J 4/04; G01J 3/0224; H04B 10/2569; H04B 10/0731; H04B 10/2572; H04B 10/291
See application file for complete search history.

(56) References Cited

U.S. PATENT DOCUMENTS

| | | | | |
|---|---|---|---|---|
| 6,144,450 | A * | 11/2000 | Jopson | G01M 11/336 250/225 |
| 6,396,575 | B1 * | 5/2002 | Holland | G01M 11/3181 356/73.1 |
| 6,493,474 | B1 * | 12/2002 | Yao | G02F 1/0136 385/11 |
| 6,576,886 | B1 * | 6/2003 | Yao | G02F 1/0136 250/225 |
| 6,735,350 | B1 * | 5/2004 | Gauthier | G02B 6/2713 385/11 |
| 6,801,686 | B2 * | 10/2004 | Sorin | G02B 6/29395 385/11 |
| 6,804,428 | B1 * | 10/2004 | Garrett | G01J 3/447 385/11 |
| 6,859,268 | B2 * | 2/2005 | Chou | H04B 10/2569 356/73.1 |
| 6,959,126 | B1 * | 10/2005 | Lofland | G01M 11/337 398/19 |
| 6,975,454 | B1 * | 12/2005 | Yan | H04B 10/2572 359/486.03 |
| 7,545,504 | B2 * | 6/2009 | Buckland | G01B 9/02091 356/479 |
| 11,002,632 | B2 * | 5/2021 | Adams | G01J 4/04 |
| 2002/0159135 | A1 * | 10/2002 | Kelkar | H04B 10/2941 359/337.1 |
| 2003/0111998 | A1 * | 6/2003 | Koh | G01M 11/337 324/96 |
| 2004/0033002 | A1 * | 2/2004 | Ouchi | G02B 6/2843 385/11 |
| 2005/0100268 | A1 * | 5/2005 | Foster | G02B 7/023 385/16 |
| 2005/0157993 | A1 * | 7/2005 | Fokine | G02B 6/022 385/123 |
| 2005/0200941 | A1 * | 9/2005 | Yao | G01J 4/00 359/301 |
| 2006/0023987 | A1 * | 2/2006 | Yao | G02B 6/2766 385/11 |
| 2006/0038999 | A1 * | 2/2006 | Hentschel | G01J 4/04 356/364 |
| 2006/0114471 | A1 * | 6/2006 | Cyr | G01M 11/331 356/477 |
| 2006/0115199 | A1 * | 6/2006 | Yao | G01M 11/337 385/11 |
| 2006/0132782 | A1 * | 6/2006 | Flanders | G01J 3/0218 356/432 |
| 2007/0086017 | A1 * | 4/2007 | Buckland | G01N 21/45 356/497 |
| 2007/0223078 | A1 * | 9/2007 | Yao | G02B 27/28 359/259 |
| 2008/0030839 | A1 * | 2/2008 | Yao | G02F 1/095 359/281 |
| 2009/0046747 | A1 * | 2/2009 | Maestle | G01M 11/337 356/73 |
| 2012/0207428 | A1 * | 8/2012 | Roelkens | G02B 6/29397 385/37 |
| 2012/0263197 | A1 * | 10/2012 | Koplow | H01S 3/0675 359/337 |
| 2013/0229648 | A1 * | 9/2013 | Chen | G01M 11/337 356/73 |
| 2018/0088002 | A1 * | 3/2018 | Ibrahim | H01S 5/06804 |
| 2020/0408637 | A1 * | 12/2020 | Adams | G02B 6/4216 |

* cited by examiner

TECHNIQUES FOR PROVIDING A SWEPT WAVELENGTH (SW) MEASUREMENT FOR ACQUIRING POLARIZATION DEPENDENT LOSS (PDL) IN A SINGLE SCAN

TECHNICAL FIELD

This patent application relates generally to measuring optical properties of devices, and more particularly, to systems and methods that utilize swept wavelength (SW) measurement techniques to acquire polarization dependent loss (PDL) of an optical component in a single scan.

BACKGROUND

Measuring wavelength-dependent insertion loss (IL) and polarization dependent loss (PDL) may be key metrics to determine performance and quality of a device-under-test (DUT) in various optical systems. However, conventional systems for measuring insertion (IL) or polarization dependent loss (PDL) lack consistency, reliability, and accuracy or may require multiple time consuming scans. Thus, an efficient and precise technique to provide accurate insertion loss (IL) and polarization dependent loss (PDL) measurements in a single scan may help overcome the shortcomings of conventional approaches.

BRIEF DESCRIPTION OF DRAWINGS

Features of the present disclosure are illustrated by way of example and not limited in the following figures, in which like numerals indicate like elements. One skilled in the art will readily recognize from the following that alternative examples of the structures and methods illustrated in the figures can be employed without departing from the principles described herein.

DETAILED DESCRIPTION

Figure 1A:
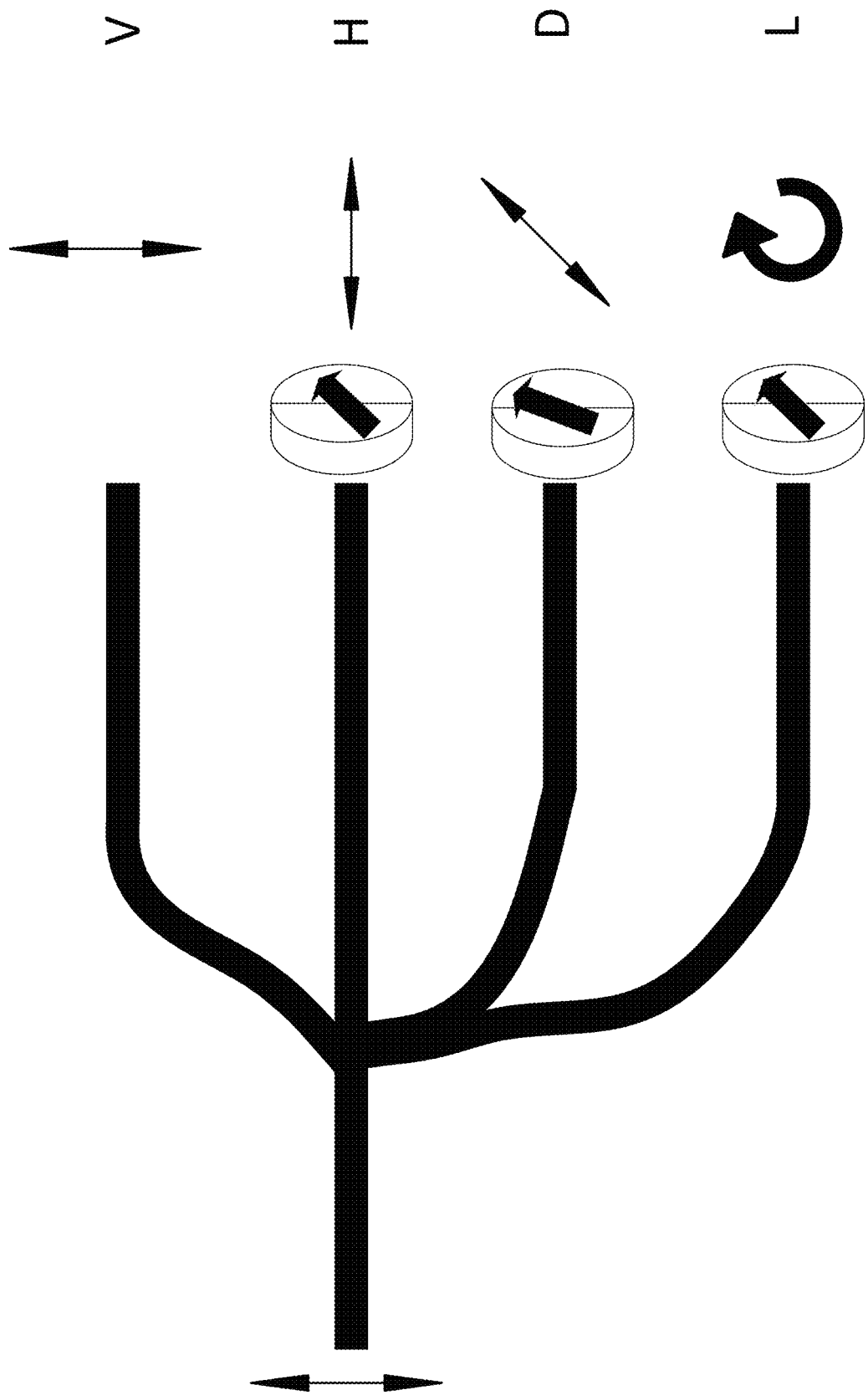
FIG. 1A illustrates four such polarization states that may be utilized in a swept wavelength system (SWS), according to an example.

For simplicity and illustrative purposes, the present application is described by referring mainly to examples thereof. In the following description, numerous specific details are set forth in order to provide a thorough understanding of the present application. It will be readily apparent, however, that the present application may be practiced without limitation to these specific details. In other instances, some methods and structures readily understood by one of ordinary skill in the art have not been described in detail so as not to unnecessarily obscure the present application. As used herein, the terms "a" and "an" are intended to denote at least one of a particular element, the term "includes" means includes but not limited to, the term "including" means including but not limited to, and the term "based on" means based at least in part on.

Background

When characterizing an optical device over a given optical band, two metrics that may be of particular interest may be insertion loss (IL) and polarization dependent loss (PDL). Insertion loss (IL) may be a loss of signal power resulting from the insertion of a device in a transmission line or optical fiber. Insertion loss (IL) may typically be expressed in decibels (dB). Polarization dependent loss (PDL) may be a loss of signal power that may vary as polarization state of a propagating wave may change. In other words, polarization dependent loss (PDL) may represent a relationship of a maximum and a minimum signal power for an optical device with respect to all polarization states. In determining a polarization dependent loss (PDL), a single insertion loss (IL) scan may measure an insertion loss (IL) at a given input polarization state. Moreover, by modifying (i.e., varying) input polarization states and taking corresponding measurements of insertion loss (IL), a composite determination of a device-under-test's (DUT) dependence on polarization may be gathered. In some examples, polarization dependent loss (PDL) may be expressed as a difference between a maximum and minimum loss in decibels (dB). An average insertion loss (IL) may also be determined by averaging a maximum and minimum insertion loss (IL). It should be appreciated that both insertion loss (IL) and polarization dependent loss (PDL) for an optical device may be wavelength dependent, and that insertion loss (IL) and polarization dependent loss (PDL) for an optical device may be utilized as key measurements of performance and quality for a device-under-test (DUT).

To determine insertion loss (IL) and polarization dependent loss (PDL), a number of traditional optical characterization methods may be utilized. Aspects of various optical characterization methods are described in U.S. Pat. Nos. 5,896,193, 6,061,124, 8,548,016 and 8,879,054, the disclosures of which are hereby incorporated by reference.

A first such method may be optical spectrum analysis, and may be performed by an optical spectrometer. An optical spectrometer may measure optical properties of a wave (e.g., a light wave) over a specific portion of the electromagnetic spectrum. In particular, to measure the optical properties, the optical spectrometer may measure the intensities associated with different wavelengths. In doing so, the optical spectrometer may measure an instantaneous insertion loss (IL) at a particular input polarization state. So, in some examples, utilizing an optical spectrometer may require explicitly setting or finding a maximum and minimum state of polarization in order to determine a polarization dependent loss (PDL). Typically, this may be done iteratively, wherein an algorithm (e.g., a search algorithm) may be utilized to determine a higher or lower loss state. Unfortunately, however, optical spectrometers may typically lack necessary resolution, be too noisy or simply take too long.

A second method may be a step wavelength method. A step wavelength method may typically employ, among other things, a tunable laser, a device under test (DUT), a power sensor, and a wavelength meter. In some examples, the tunable laser may be incremented for each wavelength "step" within a wavelength range of the emitted light wave, and then stop. Upon stopping the tunable laser, the wavelength meter may measure wavelength and the power meter may measure optical power. This process may repeat for each wavelength "step" through the wavelength range, dwelling for a period of time at each step for associated measurements to be taken. Unfortunately, however, while step wavelength testing methods may typically provide resolution and accuracy, they also may take excessive periods of time to complete.

Yet another method of optical characterization may be a swept wavelength (SW) method. In some instances, a swept wavelength system (SWS) may be similar to step wavelength systems, in that a swept wavelength system (SWS) may typically include a tunable laser, a device under test (DUT), a power sensor and a wavelength meter. In some examples, the tunable laser may continuously "sweep" across an optical band (i.e., wavelength range) of interest at a constant rate, and the power meter may measure optical power as function of time. In some examples, the gathered measurements may then be compared to reference values for the tunable laser gathered while sweeping over the optical band. In these examples, the reference values may be generated by measuring a power spectrum for the swept wavelength system (SWS) without the presence of a device-under-test (DUT).

In some examples, a swept wavelength system (SWS) may pass a scanning wavelength through a device-under-test (DUT), and compare the transmitted signal (the "through signal") against the signal's "reference". In particular, in some examples, the reference measurement may be a measurement of the signal without an influence of the device-under-test (DUT), the through signal measurement may be a measurement of the signal passing through the DUT, and the calculated difference signal may indicate the relative effect of the DUT. An example system architecture of measuring the reference measurement and the through measurement is described and shown in FIG. 1 of U.S. Pat. No. 5,896,193 (incorporated by reference herein).

In some examples a timing signal generator, such as the timing signal generator 30 shown in FIG. 1 of U.S. Pat. No. 5,896,193, may be utilized to correlate instantaneous wavelength(s) of the light during a scanning operation. In some examples, the timing signal generator (e.g., the timing signal generator 30) may trigger an absolute start-wavelength signal reference (e.g., utilizing a wavelength reference provided by a fiber Bragg grating (FBG) or a gas cell), and may create a series of optical oscillations at precise wavelengths that may provide a relative measure of the laser's position.

An example transmission characteristic of a fiber Bragg grating (FBG) is illustrated in FIG. 3 of U.S. Pat. No. 5,896,193 (incorporated by reference herein).

Figure 4:
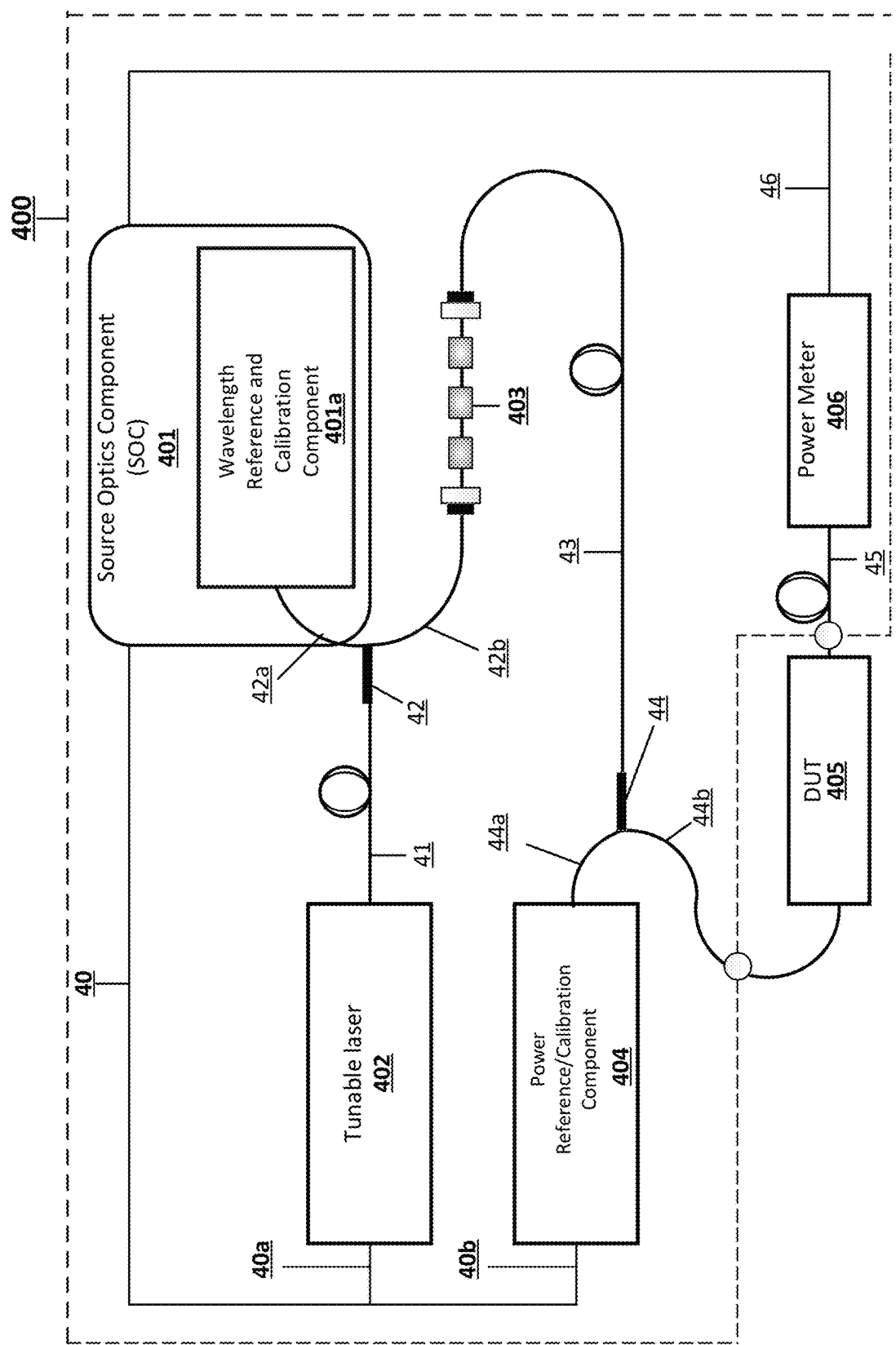
FIG. 4 illustrates an example of a swept wavelength system (SWS), according to an example.

In some examples, when a laser signal may pass through a narrow band of a fiber Bragg grating (FBG), a resonance condition may be met. In these instances, a resultant low-light level may be achieved and a trigger for a "start" wavelength may be provided. Also, in these instances, a relative instantaneous position of the laser (as compared to the triggered start-wavelength) may be computed by counting an accumulated number of optical fringes that may have passed since the start-wavelength. An example transmission spectrum is illustrated in FIG. 4 of U.S. Pat. No. 5,896,193 (incorporated by reference herein).

Accordingly, in some examples, a swept wavelength system (SWS) as described may provide generation of a precision time-base that may enable determination of an instantaneous wavelength, and further may enable correlation with a plurality of sampled power levels. As such, a swept wavelength system (SWS) as described may provide a time-record of optical sampled power state(s) versus wavelength(s). It should be appreciated that, in some examples, generation of precision wavelength time-base information as described may be critical to enabling key interpolations for examples described herein.

In some examples, to obtain a complete characterization of a device-under-test (DUT), a swept wavelength system (SWS) may record insertion loss (IL) spectrum for four separate input polarization states. In particular, a tunable laser may conduct four separate sweeps performed at four orthogonal polarization states.

FIG. 1A illustrates four such polarization states that may be utilized in a swept wavelength system (SWS), according to an example. In this example, the four orthogonal input polarization states may include vertical (V), horizontal (H), 45-degree (D) and left-hand circular (L). In some examples, the four orthogonal polarization states V, H, D and L may cover a polarization space in such a way as to enable calculation of all relevant Mueller parameters for a device-under-test (DUT) transfer matrix. For example, a polarization element may enable four separate sweeps for each the plurality of orthogonal reference polarization states V, H, D and L as follows:

Trace 1=>[insertion loss (IL) state V, insertion loss (IL) state V, insertion loss (IL) state V, . . . ]
Trace 2=>[insertion loss (IL) state H, insertion loss (IL) state H, insertion loss (IL) state H, . . . ]
Trace 3=>[insertion loss (IL) state D, insertion loss (IL) state D, insertion loss (IL) state D, . . . ]
Trace 4=>[insertion loss (IL) state L, insertion loss (IL) state L, insertion loss (IL) state L, . . . ]

The Mueller parameters of the device-under-test (DUT) transfer matrix may then be used to determine arbitrary polarization states that may produce a maximum and minimum insertion loss (IL). In addition, in some examples, the maximum and minimum insertion loss (IL) may be utilized to determine a polarization dependent loss (PDL) and an average insertion loss (IL).

Figure 1B:
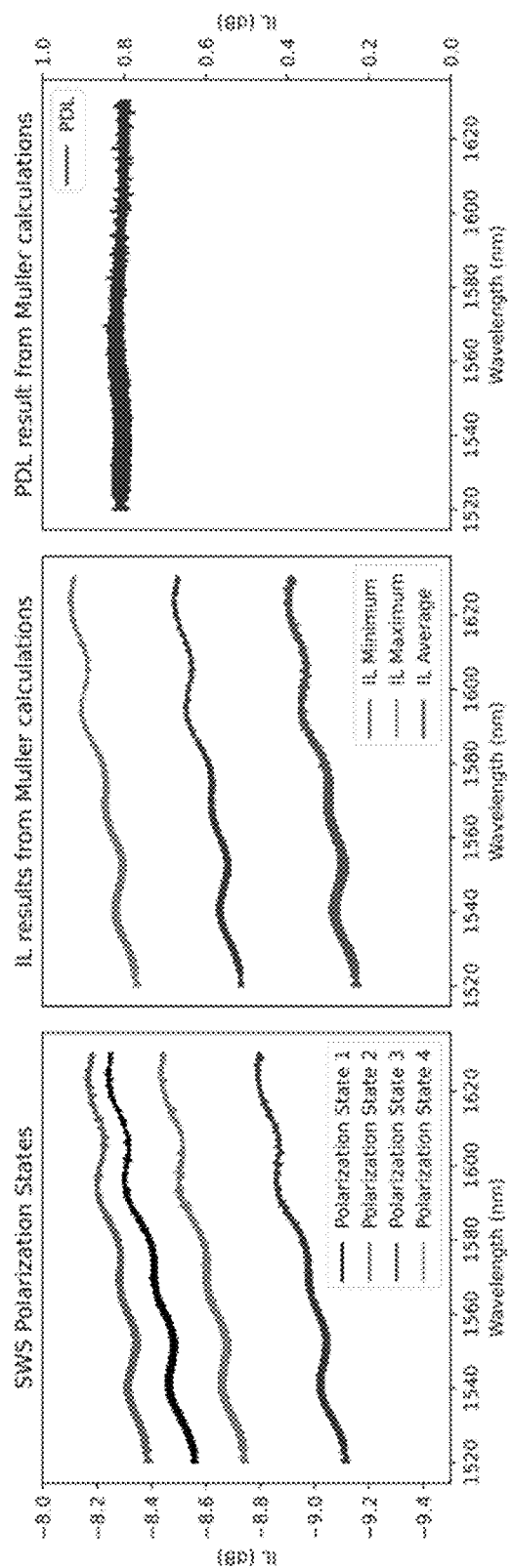
FIG. 1B illustrates example polarization dependent loss (PDL) measurements according to a current swept wavelength system (SWS), according to an example.

In some examples, the four-state polarization swept wavelength system (SWS) may provide accurate results. However, in many instances, acquisition of four separate sweep across an optical band of interest may be time-consuming. FIG. 1B illustrates example polarization dependent loss (PDL) measurements according to a current swept wavelength system (SWS).

Examples

Systems and methods herein may relate to utilizing swept wavelength (SW) measurement techniques for acquiring, among other things, polarization dependent loss (PDL) for an optical device in a single scan. As discussed below, in some examples, the systems and methods described may include a component (or device) that may enable polarization state(s) of an optical signal to "scramble" such that a maximum insertion loss (IL) and a minimum insertion (IL) may be acquired. Also, in some examples, the systems and methods may acquire an average insertion loss (IL) and polarization dependent loss (PDL) for a device-under-test (DUT) in a single scan using enhanced swept wavelength (SW) measurement techniques as described.

In some examples, swept wavelength (SW) measurement techniques as described may be used to, among other things, rapidly troubleshoot optical device performance issues and confirm low polarization dependent loss (PDL) devices. Furthermore, rapid optical characterization methods provided via the swept wavelength (SW) measurement techniques described may remove testing inefficiencies and improve manufacturing yield and by providing real-time in-situ analysis and feedback.

Figure 2A:
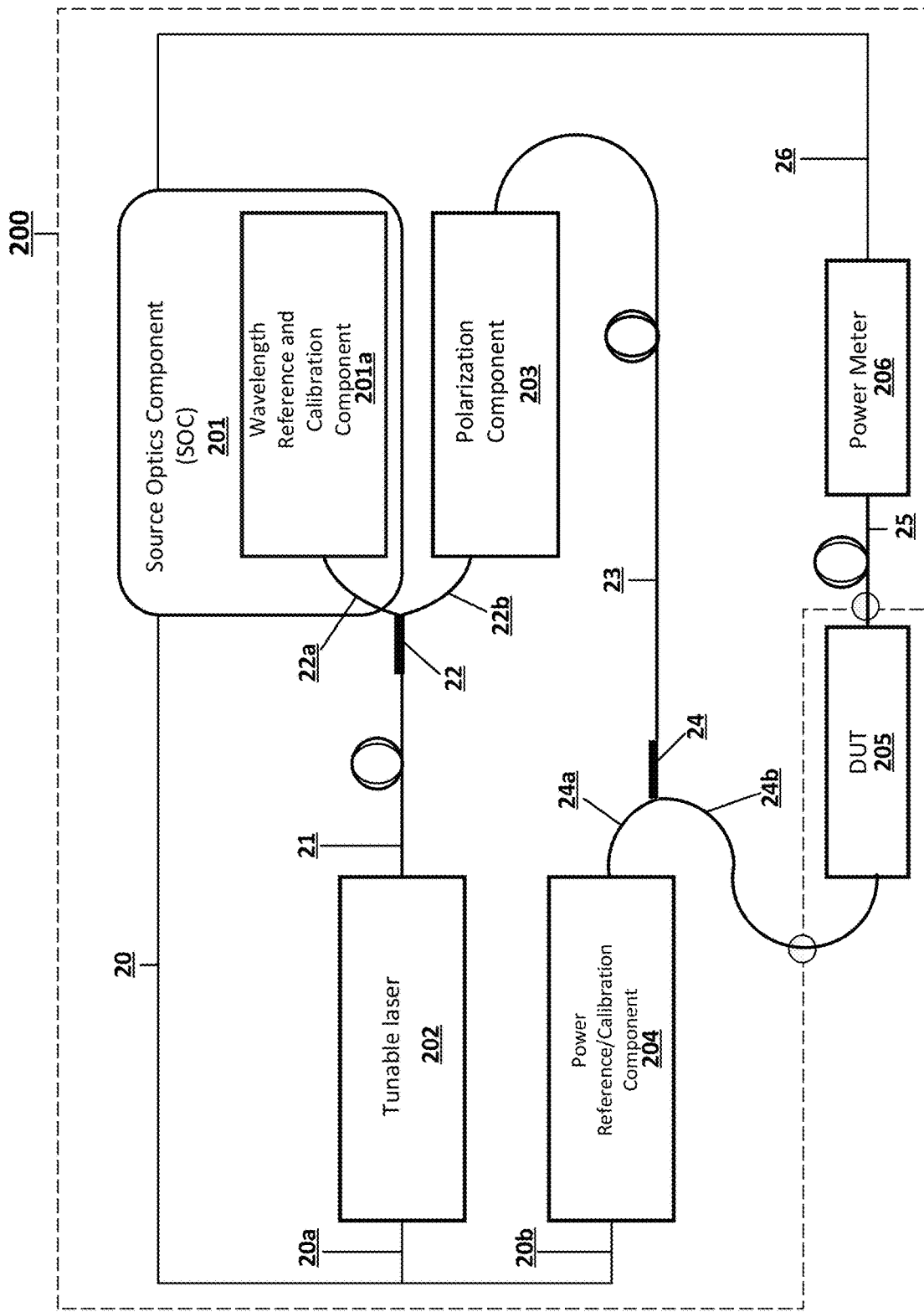
FIG. 2A illustrates an example of a swept wavelength system (SWS), according to an example.

FIG. 2A illustrates an example of a swept wavelength system (SWS) 200, according to an example. In some examples, the swept wavelength system (SWS) 200 may include a source optics component (SOC) 201, a tunable laser 202, a polarization element 203, a power reference and calibration component 204 and a power meter 206.

In these examples, and as will be discussed below, the swept wavelength system (SWS) 200 may determine a maximum and a minimum insertion loss (IL) over an acquisition time to generate a maximum and minimum insertion loss (IL) spectrum associated with a device-under-test (DUT) 205. In addition, the swept wavelength system (SWS) 200 may generate a corresponding average insertion loss (IL) and polarization dependent loss (PDL) associated with the device-under-test (DUT) 205 as well.

In some examples, the source optics component (SOC) 201 may be a command and control system for the swept wavelength system (SWS) 200, and may implement various functionalities associated with the swept wavelength system (SWS) 200. So, in some examples, the source optics component (SOC) 201 may function as a data acquisition and analysis component for the swept wavelength system (SWS) 200.

More particularly, the source optics component (SOC) 201 may utilize the data connection 20 and data connection 26 to receive, transmit and analyze measurement information (e.g., instructions) and data from the tunable laser 202, the power reference and calibration component 204 and/or the power meter 206. Furthermore, in some examples source optics component (SOC) 201 may determine a maximum insertion loss (IL) and a minimum insertion loss (IL) associated with a device-under-test (DUT), and may utilize the maximum insertion loss (IL) and a minimum insertion loss (IL) associated with a device-under-test (DUT) to determine an average insertion loss (IL) and a polarization dependent loss (PDL) associated with the device-under-test (DUT). Also, in some examples, the source optics component (SOC) 201 may include a wavelength reference and calibration component 201a which may calibrate/synchronize wavelengths of light waves emitted from the tunable laser 202.

In some examples, the source optics component (SOC) 201 may be coupled to the tunable laser 202 via split connection 20a and to the power reference and calibration component 204 via split connection 20b. Also, in some examples, the tunable laser 202 may be coupled to the wavelength reference and calibration component 201a via an optical connection 21. In particular, in some examples, the tunable laser 202 may be coupled to the wavelength reference and calibration component 201a via a splitter 22 and the splitter connection 22a.

In some examples, the tunable laser 202 may be a device that may emit an optical signal (or a "light wave") whose wavelength may be altered in a controlled manner. In particular, upon receiving instructions from the source optics component (SOC) 201, the tunable laser 202 may emit an optical signal that may continuously "sweep" across an optical band (i.e., wavelength range) of interest at a constant rate. In some examples, the tunable laser 202 may be configured to sweep across the optical band once to enable determining of maximum insertion loss (IL) values and a minimum insertion loss (IL) values over an "acquisition" time, and determining of a maximum and minimum insertion loss (IL) spectrum associated with a device-under-test (DUT) 205 as well.

In some examples, the polarization element 203 (also referred to as "polarization scrambler") may be an optical device that may enable modifications to polarization states of light. In particular, in some examples, the polarization element 203 may utilize a controller to "scramble" (also "vary" or "modify") polarizations states of an optical signal emitted from the tunable laser 202. In some examples, as discussed below, the polarization element 203 may vary polarization states in a single sweep of the tunable laser 202 and over an acquisition time to include polarization states that may correspond to a maximum insertion loss (IL) and a minimum insertion loss (IL).

In some examples, the polarization element 203 may scramble the polarization states randomly, while in other examples the polarization element 203 may scramble the polarization states deterministically. Also, in some examples, to ensure acquisition of the polarization states that may correspond to the maximum insertion (IL) and the minimum insertion loss (IL), the polarization element 203 may vary the polarization states rapidly.

In some examples, the polarization element 203 may be coupled to the tunable laser 202 via optical connection 21, the splitter 22 and the splitter connection 22b. So, in some examples, an optical signal emitted by the tunable laser 202 and transmitted via the optical connection 21 (and over split connection 22b via splitter 22) may be received at the polarization element 203, where the polarization element 203 may scramble the polarization states of the emitted light wave.

In some examples, to determine a maximum and minimum insertion loss (IL) over an acquisition time and to compute an entire maximum and minimum insertion (IL) spectrum, a maximum and minimum insertion loss (IL) for each scrambled polarization state in the acquisition time may be captured (i.e., determined). That is, in some examples, instead of only determining a maximum and minimum insertion loss (IL) values that may be averaged over a number of polarization states, the polarization element 203 and the power meter 206 may enable determining of a maximum and minimum insertion loss (IL) for each scrambled state. Accordingly, this may increase opportunities to acquire accurate maximum and minimum insertion loss (IL) values.

Figure 2B:
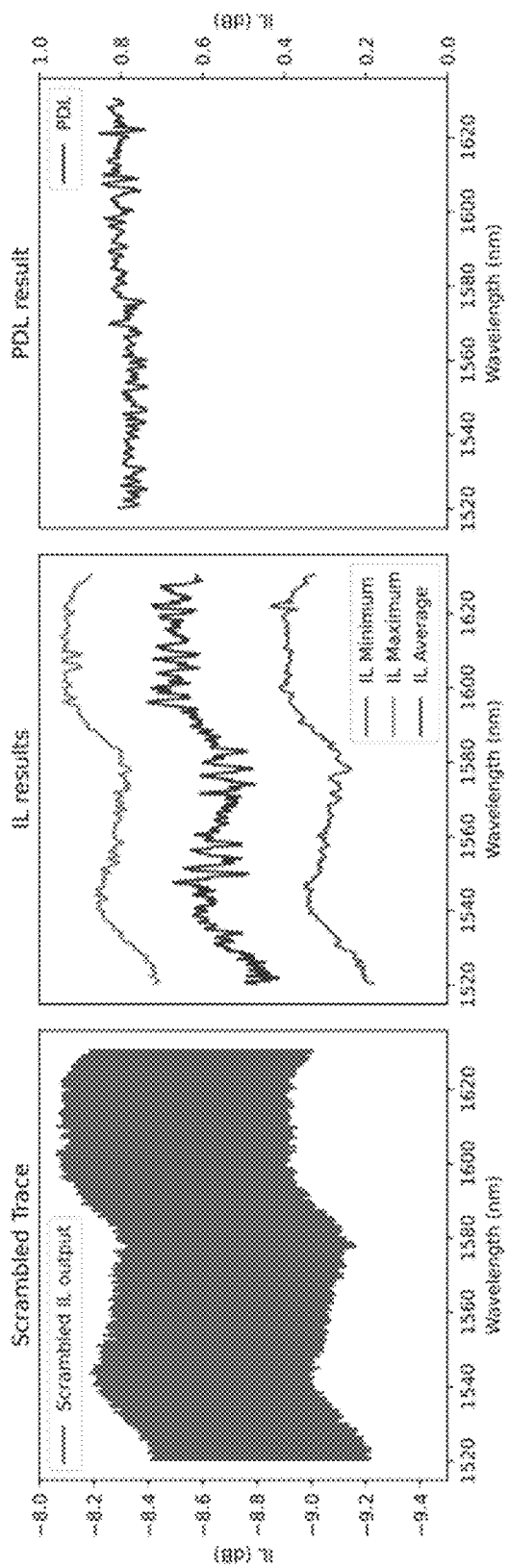
FIG. 2B illustrates example polarization dependent loss (PDL) measurements according to a swept wavelength system (SWS) as described, according to an example.

In some examples, the polarization element 203 may vary the polarization states at a rate with respect to a speed at which the tunable laser 202 may be scanning, so that a maximum and minimum insertion loss (IL) may be captured for each and every polarization state within the particular (i.e., ideally minimum) wavelength range. As discussed above, the maximum insertion loss (IL) and the minimum insertion loss (IL) values may then be used to determine an average insertion loss (IL) and a polarization dependent loss (IL). FIG. 2B illustrates example polarization dependent loss (PDL) measurements according to a swept wavelength system (SWS) as described, according to an example.

Figure 2C:
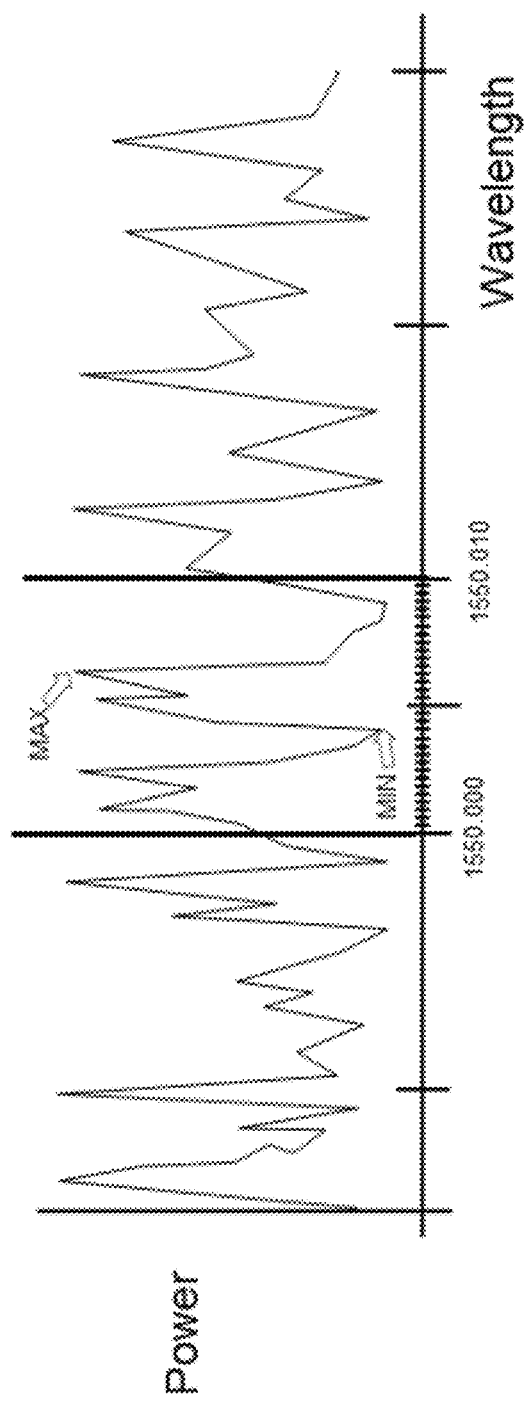
FIG. 2C illustrates example measurements associated with a swept-wavelength system (SWS) implementing a teen (10) picometer spectral scrambling interval, according to an example.

For example, in some instances, a system scrambling rate, a laser sweep rate, and a power-sampling may be tuned in such a way that a maximum insertion loss (IL) and a minimum insertion loss (IL) may be found over a 10 picometer spectral scrambling interval. FIG. 2C illustrates example measurements associated with a swept-wavelength system (SWS) implementing a 10 picometer spectral scrambling interval.

Figure 2D:
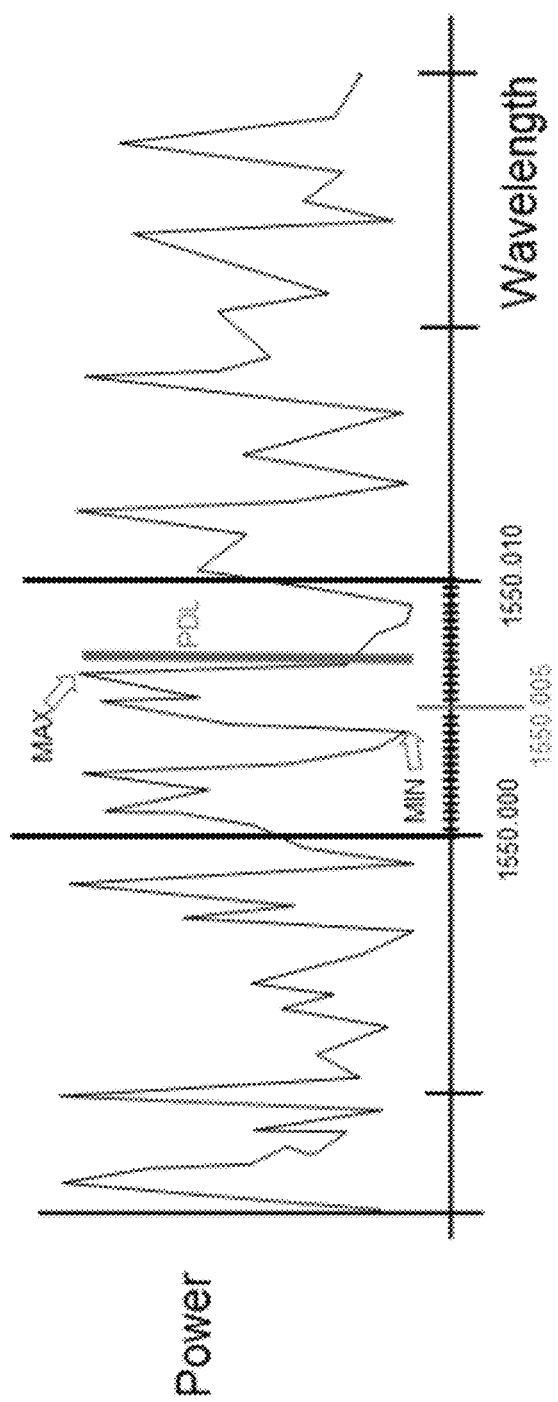
FIG. 2D illustrates example measurements associated with a swept-wavelength system (SWS) for a single polarization dependent loss (PDL) measurement for a range of wavelengths, according to an example.

As discussed above, in some examples, to determine a polarization dependent loss (PDL), a maximum insertion loss (IL) and a minimum insertion loss (IL) may be computed, wherein a wavelength may be associated with the derived polarization dependent loss (PDL) measurement. In some examples, a precise time-base (as described above) may be utilized to attribute the single polarization dependent loss (PDL) measurement to a range of wavelengths. An example of attributing a single polarization dependent loss (PDL) measurement to a range of wavelengths is illustrated in FIG. 2D.

Figure 2E:
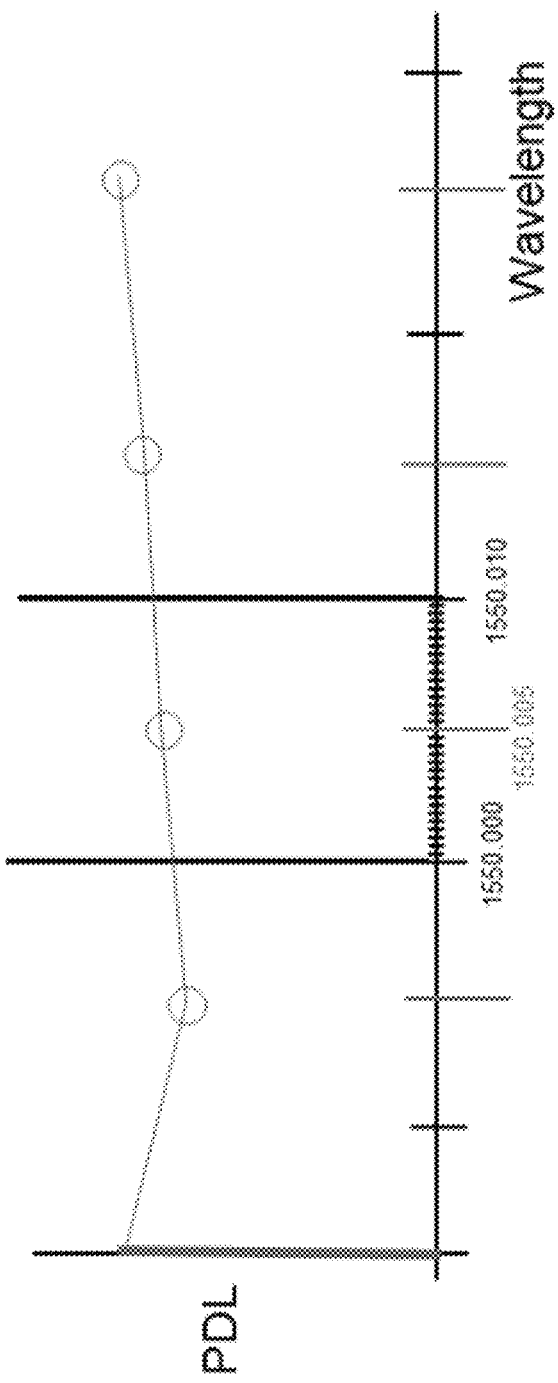
FIG. 2E illustrates example measurements associated with a polarization dependent loss (PDL) spectrum, according to an example.

In addition, in some examples, by determining a polarization dependent loss (PDL) utilizing a maximum insertion loss (IL) and a minimum insertion loss (IL) determined over one or more scrambling intervals, and by associating each determined polarization dependent loss (PDL) with an interpolated wavelength, a polarization dependent loss (PDL) spectrum for a device-under-test (DUT) may be obtained. An example of such a polarization dependent loss (PDL) spectrum is illustrated in FIG. 2E.

It should be appreciated that, to acquire accurate maximum and minimum insertion loss (IL) values, the polarization element 203 may be configured to implement more than one scrambling mode. In one example, the polarization element 203 may implement a temporal scrambling mode, wherein the polarization element 203 may temporally vary the polarization states. In another example, the polarization element 203 may implement a spectral scrambling mode (e.g., via a Lyot filter).

It should further be appreciated that the polarization element 203 may introduce its own wavelength-dependent insertion loss (IL) and polarization dependent loss (PDL). However, these may be removed from the maximum insertion loss (IL) and minimum insertion loss (IL) calculations by reference in an absence of the device-under-test 205, and by splitting the (scrambled) light wave emitted from the tunable laser 202 into a reference arm in order to remove the influence of the polarization element 203.

In some examples, the polarization element 203 may be positioned "upstream" of the power reference and calibration component 204 to ensure that any effects produced by the polarization element 203 may be accounted for and removed during measurement. So, in some examples, the polarization element 203 may add an insertion loss (IL) fluctuation or a polarization dependent loss (PDL), which may collectively be referred to as "artifacts". In these examples, placement of the polarization element 203 upstream may enable removal of these artifacts and may provide an enhanced signal-to-noise ratio.

In some examples, the power reference and calibration component 204 may be utilized to calibrate and measure power associated with an optical signal emitted from the tunable laser 202. The power reference and calibration component 204 may, among other things, measure power of the optical signal without (i.e., prior to) influence of the device-under-test (DUT) 205. In some examples, the power reference and calibration component 204 may receive the (scrambled) light wave from the polarization element 203 via an optical connection 23 and over split connection 24a via splitter 24.

In some examples, an optical signal may also be transmitted over the optical connection 23 and splitter connection 24b to the device-under-test (DUT) 205. Upon passing through the device-under-test (DUT) 205, the optical signal may be transmitted over the optical connection 25 to the power meter 206. The power meter 206 may be a measurement device configured to measure power of an optical signal, such as an optical signal emitted by the tunable laser 202. In particular, the power meter 206 may be utilized to take a power measurement for an optical signal scrambled by the polarization element 203 and passed through the device-under-test (DUT) 205.

In some examples, the power measurements gathered via the power reference and calibration component 204 (without the presence of the device-under-test (DUT) 205) may be compared to the power measurements gathered via the power meter 206 (after passing through the device-under-test (DUT) 205). These power measurements may be transmitted to the source optics component (SOC) 201 over the data connections 20 and 26 respectively, and may be utilized to calibrate operations of the swept wavelength system (SWS) 200. In particular, in some examples, the power measurements may be used to determine a difference between an intensity spectrum measured with and without a presence of the device-under-test (DUT) 205. The power meter 206 may, in some instances, enable removal of power variations that may occur over time which may be not related to the insertion loss (IL) of the device-under-test (DUT) 205.

Moreover, in some examples, the swept wavelength system (SWS) 200 may also include a detector element. In these examples, the detector element may enable separation of the tunable laser 202 and the receiver units, such as the polarization element 203 and/or the power reference and calibration component 204. In these examples, the data may be processed directly in the detector element so as to minimize (or eliminate) any processing delays during data transfer.

Figure 3A:
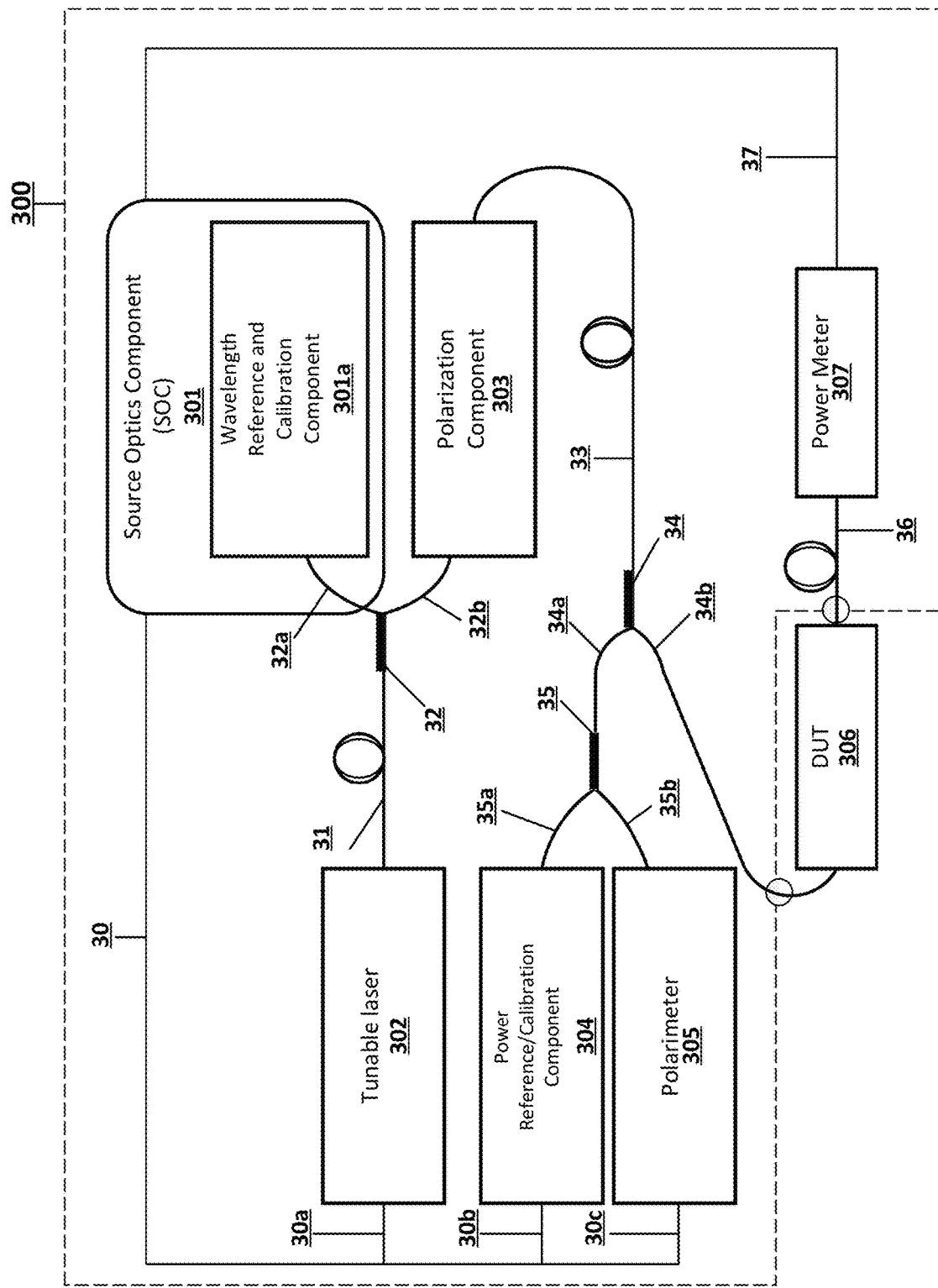
FIG. 3A illustrates an example of a swept wavelength system (SWS), according to an example.

FIG. 3A illustrates an example of a swept wavelength system (SWS) 300, according to an example. In some examples, the swept wavelength system (SWS) 300 may include a source optics component (SOC) 301, a tunable laser 302, a polarization element 303, a power reference and calibration component 304, a polarimeter 305 and a power meter 307.

In these examples, and as will be discussed below, the swept wavelength system (SWS) 300 may determine a maximum and a minimum insertion loss (IL) value over an acquisition time to generate a maximum and minimum insertion loss (IL) spectrum associated with a device-under-test (DUT) 306. Moreover, the swept wavelength system (SWS) 300 may further generate an corresponding average insertion loss (IL) and polarization dependent loss (PDL) associated with a device-under-test (DUT) 306 as well.

In some examples, the source optics component (SOC) 301 may be a command and control system for the swept wavelength system (SWS) 300, and may implement various functionalities associated with the swept wavelength system 300. Similar to the source optics component (SOC) 201 shown in FIG. 2A, in some examples, the source optics component (SOC) 301 may function as a data acquisition and analysis component for the swept wavelength system (SWS) 300.

More particularly, the source optics component (SOC) 301 may utilize the data connection 30 and data connection 37 to receive, transmit and analyze measurement information (e.g., data) from the tunable laser 302, the power reference and calibration component 304 and/or the power meter 307. Furthermore, in some examples source optics component (SOC) 301 may determine a maximum insertion loss (IL) and a minimum insertion loss (IL) associated with a device-under-test (DUT), and may utilize the maximum insertion loss (IL) and a minimum insertion loss (IL) associated with a device-under-test (DUT) to determine an average insertion loss (IL) and a polarization dependent loss (PDL) associated with the device-under-test (DUT). In some examples, the source optics component (SOC) 301 may include a wavelength reference and calibration component 301*a* that may calibrate light wave wavelengths of the tunable laser 302.

In these examples, the source optics component (SOC) 301 may be coupled to the tunable laser 302 via split connection 30*a*, to the power reference and calibration component 304 via split connection 30*b* and to the polarimeter 305 via the split connection 30*c*. In some examples, the tunable laser 302 may be coupled to the wavelength reference and calibration component 301*a* via an optical connection 31. In particular, in some examples, the tunable laser 302 may be coupled to the wavelength reference and calibration component 301*a* via a splitter 32 and the splitter connection 32*a*.

In some examples, the tunable laser 302 may be a device that may emit an optical signal whose wavelength may be altered in a controlled manner. In particular, similar to the tunable laser 202, upon receiving instructions from the source optics component (SOC) 301, the tunable laser 302 may emit an optical signal to continuously "sweep" across an optical band (i.e., wavelength range) of interest at a constant rate. In some examples, the tunable laser 302 may be configured to sweep across the optical band once to determine a maximum and a minimum insertion loss (IL) value over an acquisition time and generate a maximum and minimum insertion loss (IL) spectrum associated with a device-under-test (DUT) 306.

In some examples, the polarization element 303 may be an optical device that may enable modifications to polarization states of light. In particular, similar to the polarization element 203 in FIG. 2A, the polarization element 303 may enable scrambling to polarizations states of an optical signal emitted from the tunable laser 302.

In some examples, the polarization element 303 may be configured to vary polarization states in a single sweep of the tunable laser 302 and over an acquisition time to include a plurality of polarization states that may correspond to a maximum insertion loss (IL) and a minimum insertion loss (IL). In some examples, the plurality of reference polarization states may include a plurality of orthogonal "reference" polarization states, including vertical (V), horizontal (H), 45-degree (D) and left-hand circular (L). In some examples, the plurality of orthogonal reference polarization states V, H, D and L may cover a polarization space in such a way as to enable calculation of all relevant Mueller parameters for a device-under-test (DUT) transfer matrix. In other examples, other numbers of reference polarization states (e.g., six, eight, sixteen, etc.) may be used as well.

So, in some examples, the polarization element 303 may be configured to repeatedly vary a plurality of orthogonal reference polarization states V, H, D and L within a single scan. That is, in some examples, the polarization element 303 may vary the plurality of orthogonal reference polarization states V, H, D and L in sequence and synchronized with sweeping of the tunable laser 302. Furthermore, in some examples, the plurality of orthogonal reference polarization states V, H, D and L may be varied in such a way as to enable generating of the plurality of orthogonal reference polarization states in a single sweep of the tunable laser 302. For example, the polarization element 303 may vary the plurality of orthogonal reference polarization states V, H, D and L in a single sweep as follows:

Trace=>[insertion loss (IL) state V, insertion loss (IL) state H, insertion loss (IL) state D, insertion loss (IL) state L, insertion loss (IL) state V, insertion loss (IL) state H, . . . ].

Figure 3B:
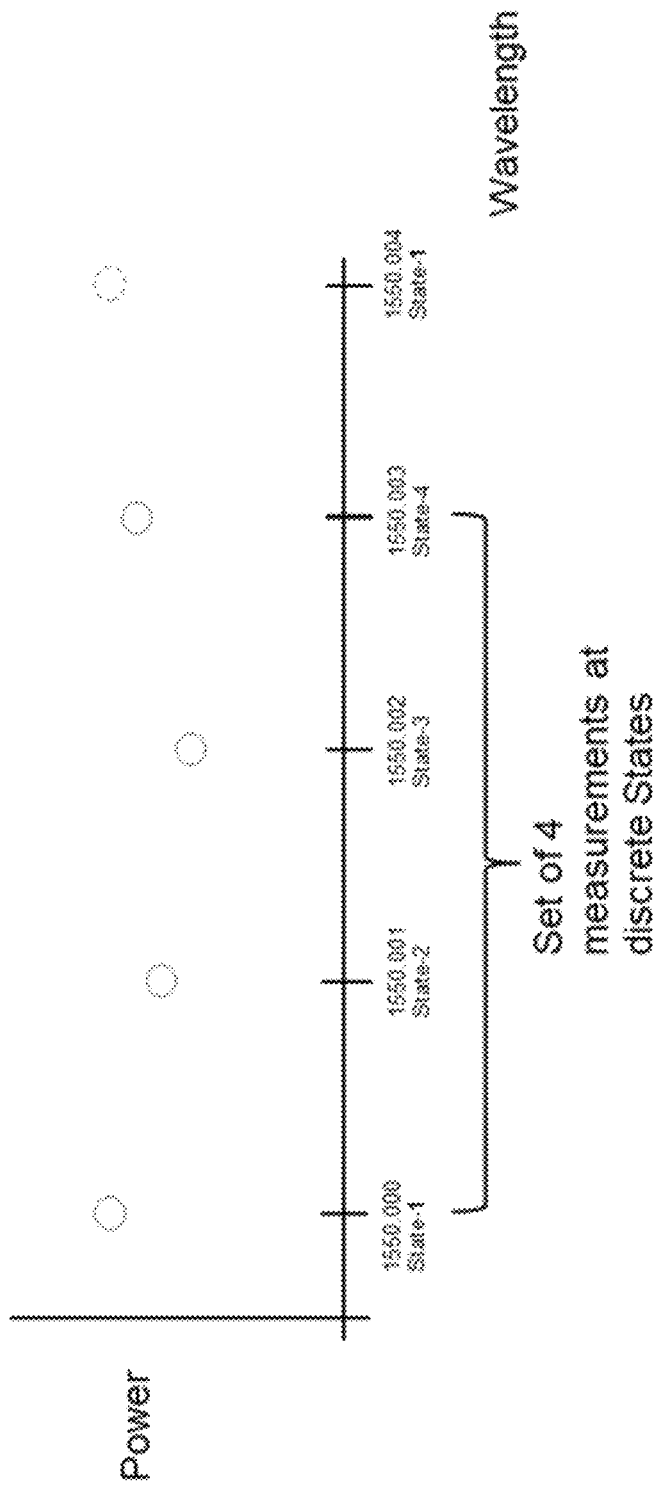
FIG. 3B illustrates example measurements associated with a swept-wavelength system (SWS) implementing a discrete state of polarization (SOP) at each picometer of spectral resolution, according to an example.

An example of utilizing a "single power time record array" that may be interleaved with a plurality of state of polarizations (SOPs) is illustrated in FIG. 3B. In the example illustrated in FIG. 3B, one discrete state of polarization (SOP) at each picometer of spectral resolution may be implemented.

It should be appreciated that, in some examples, each state of polarization (SOP) measurement may be at a different wavelength position. It should further be appreciated that, in some examples, the swept wavelength system (300) may interpolate to a common time-base (or wavelength). Furthermore, it should also be appreciated that, in these examples, a wavelength and a state of polarization (SOP) both may vary simultaneously, and may be associated with a time-base as described above.

In some examples, upon demultiplexing the insertion loss (IL) values gathered for each of the plurality of orthogonal reference polarization states gathered in a single sweep, a maximum and minimum insertion loss (IL) a polarization dependent loss (PDL) and average insertion loss (IL) may be calculated.

In some examples, the polarization element 303 may be coupled to the tunable laser 302 via optical connection 31, the splitter 32 and the splitter connection 32*b*. So, in some examples, an optical signal emitted by the tunable laser 302 and transmitted via the optical connection 31 (and over split connection 32*b* via splitter 32) may be received at the polarization element 303, where the polarization element 303 may scramble the polarization states of the emitted light wave.

In some examples, the power reference and calibration component 304 may be utilized to calibrate and measure power associated with an optical signal emitted from the tunable laser 302. The power reference and calibration component 304 may, among other things, measure power of the optical signal without (i.e., prior to) influence of the device-under-test (DUT) 306. In particular, in some examples, the power reference and calibration component 304 may receive the scrambled light wave via an optical connection 33, over split connection 34*a* via splitter 34 and also over split connection 35*a* via splitter 35.

In some examples, the polarimeter 305 may measure an angle of rotation caused by passing the polarized light wave (via the polarization element 303) through an optically active substance. The polarimeter 305 may be utilized to measure a plurality of reference polarization states generated by the polarization element 303 to enable corrections/adjustments to be made to calculations of maximum and minimum insertion loss (IL), polarization dependent loss (PDL) and average insertion loss (IL). In some examples, the polarimeter 305 may receive a scrambled light wave via the optical connection 33 (from the polarization element 303), over split connection 34a and via splitter 34 and also over split connection 35b via splitter 35.

The power meter 307 may a measurement device configured to measure power for an optical signal, such as an optical signal emitted by the tunable laser 302. In some examples, the optical signal may also be transmitted over the optical connection 33 (from the polarization element 303) and the splitter connection 34b via the splitter 34 to the device-under-test (DUT) 306. Upon the optical signal passing through the device-under-test (DUT) 306, the optical signal may be transmitted over optical connection 36 to the power meter 307, where the power meter 307 may take a power measurement for a scrambled light wave passed through the device-under-test (DUT) 306.

In some examples, measurements associated with the four polarization states may be interpolated and associated with a single wavelength by utilizing a time-base (as described above). Moreover, in these examples, the corresponding (four) power measurements may be utilized to generate the polarization-dependent loss (PDL) for each interval. Accordingly, in some examples, particular state(s)-of-polarization (SOPs), performance at these state(s) of polarization (SOPs) may be calculated. Moreover, in some examples, state(s)-of-polarization (SOPs) corresponding to a maximum insertion loss (IL), minimum insertion loss (IL), a transverse-electric (TE) state and a transverse-magnetic (TM) state may be calculated as well.

FIG. 4 illustrates an example of a swept wavelength system (SWS) 400, according to an example. In some examples, the swept wavelength system (SWS) 400 may include a source optics component (SOC) 401, a tunable laser 402, a polarization element 403, a power reference and calibration component 404 and a power meter 406.

In these examples, and as will be discussed below, the swept wavelength system (SWS) 400 may determine a maximum and a minimum insertion loss (IL) value over a particular (e.g., a predetermined minimum) time frame to generate a maximum and minimum insertion loss (IL) spectrum associated with a device-under-test (DUT) 405. Furthermore, the swept wavelength system (SWS) 400 may further generate an corresponding average insertion loss (IL) and polarization dependent loss (PDL) associated with a device-under-test (DUT) 405 as well.

In some examples, the source optics component (SOC) 401 may be a command and control system for the swept wavelength system (SWS) 400, and may implement various functionalities associated with the swept wavelength system (SWS) 400. In some examples, the source optics component (SOC) 401 may function as a data acquisition and analysis component for the swept wavelength system (SWS) 400. More particularly, the source optics component (SOC) 401 may utilize the data connection 40 and data connection 46 to receive, transmit and analyze measurement information (e.g., instructions) and data from the tunable laser 402, the power reference and calibration component 404 and/or the power meter 406. In some examples, the source optics component (SOC) 401 may be coupled to the tunable laser 402 via split connection 40a and to the power reference and calibration component 404 via split connection 40b.

In some examples, the source optics component (SOC) 401 may include a wavelength reference and calibration component 401a that may calibrate wavelengths of the tunable laser 402. In some examples, the tunable laser 402 may be coupled to the wavelength reference and calibration component 401a via an optical connection 41. In particular, in some examples, the tunable laser 402 may be coupled to the wavelength reference and calibration component 401a and splitter connection 42a via splitter 42.

In some examples, the tunable laser 402 may be a device that may emit an optical signal whose wavelength may be altered in a controlled manner. In particular, upon receiving instructions from the source optics component (SOC) 401, the tunable laser 402 may emit an optical signal to continuously "sweep" across an optical band (i.e., wavelength range) of interest at a constant rate. In some examples, the tunable laser 402 may be configured to sweep across the optical band once to determine a maximum and a minimum insertion loss (IL) value over an acquisition time and determine a maximum and minimum insertion loss (IL) spectrum associated with a device-under-test (DUT) 405.

In some examples, the polarization element 403 may enable modifications to polarization states of light. In some examples, the polarization element 403 may be a combination of high-order waveplates, which may enable "scrambling" of polarizations states of an optical signal emitted from the tunable laser 402. That is, in some examples the combination of high-order waveplates of the polarization element 403 may be wavelength-dependent or wavelength-variable, wherein as a wavelength of an optical signal may change, a corresponding polarization state of the optical signal emitted by the tunable laser 402 may change as well. In some examples, the polarization element 403 may include one or more waveplates. Moreover, in some examples, the one or more waveplates may be crystal waveplates, while in other examples, the one or more waveplates may be fiber devices.

As shown in FIG. 4, in some examples, the polarization element 403 may be coupled to the tunable laser 402 via optical connection 41, the splitter 42 and the splitter connection 42b. In some examples, an optical signal emitted by the tunable laser 402 and transmitted via the optical connection 41 (and over split connection 42b via splitter 42) may be received at the polarization element 403, where the polarization element 403 may be utilized to scramble the polarization states of the optical signal emitted by the tunable laser 402.

In some examples, as discussed below, the polarization element 403 may be configured to vary polarization states within a particular wavelength range to include polarization states that may correspond to a maximum insertion loss (IL) and a minimum insertion loss (IL) in a single sweep of the tunable laser 402. As discussed above, the maximum insertion loss (IL) and the minimum insertion loss (IL) may then be used to determine an average insertion loss (IL) and a polarization dependent loss (PDL).

It should be appreciated that to determine a maximum and minimum insertion loss (IL) values over a limited time frame to compute an entire maximum and minimum insertion (IL) spectrum, the swept wavelength system (SWS) 400 may determine a maximum and minimum insertion loss (IL) for each and every scrambled state implemented over an acquisition time by the polarization element 403. That is, in some examples, instead of only determining a maximum and minimum insertion loss (IL) values that may be averaged over a number of polarization states, the polarization element 403 and the power meter 406 may be utilized to determine a maximum and minimum insertion loss (IL) value for each scrambled state. And as such, this may increase opportunities to acquire accurate maximum and minimum insertion loss (IL) values.

It should further be appreciated that the polarization element 403 may introduce its own wavelength-dependent insertion loss (IL) and polarization dependent loss (PDL).

However, these may be removed from the maximum insertion loss (IL) and minimum insertion loss (IL) calculations by reference in an absence of the device-under-test 405 and by splitting the (scrambled) light wave emitted from the tunable laser 402 into a reference arm in order to remove the influence of the polarization scrambler.

In some examples, the power reference and calibration component 404 may be utilized to calibrate and measure power associated with an optical signal (i.e., a laser) emitted from the tunable laser 402. The power reference and calibration component 404 may, among other things, measure power of the scrambled light wave without (i.e., prior to) influence of the device-under-test (DUT) 405. In particular, in some examples, the power reference and calibration component 404 may receive a (scrambled) light wave via an optical connection 43 and over split connection 44a via splitter 44.

In some examples, an optical signal may also be transmitted over the optical connection 43 and the splitter connection 44b to the device-under-test (DUT) 405. Upon passing through the device-under-test (DUT) 405, the optical signal may be transmitted over the optical connection 45 to the power meter 406. The power meter 406 may a measurement device configured to measure power for an optical signal, such as an optical signal emitted by the tunable laser 402. In some examples, the optical signal may also be transmitted over the optical connection 43 (from the polarization element 403) and the splitter connection 44b via the splitter 44 to the device-under-test (DUT) 405. Upon the optical signal passing through the device-under-test (DUT) 405, the optical signal may be transmitted over optical connection 45 to the power meter 406, where the power meter 406 may take a power measurement for a (scrambled) light wave passed through the device-under-test (DUT) 405.

In some examples, as discussed above, the power measurements gathered via the power meter 406 (after passing through the device-under-test (DUT) 405) may be compared to reference power measurement values gathered via the power reference and calibration component 404 (without the presence of the device-under-test (DUT) 405). These power measurements may be transmitted to the SOM 401 over the data connections 40 and 46 respectively, and may be utilized to calibrate operations of and record measurements from the swept wavelength system (SWS) 400.

It should be appreciated that when the minimum insertion loss (IL) for a device-under-test (DUT) is "too low" (i.e., compared to the maximum), this may correspond to a polarization dependent loss (PDL) that may "too large". That is, in instances where the polarization dependent loss (PDL) may be too large, the minimum insertion loss (IL) may be difficult to find, and therefore an associated measurement and determination of the minimum insertion loss (IL) may be inaccurate. Conversely, if the minimum insertion loss (IL) may be closer to the maximum insertion loss (IL), the polarization dependent loss (PDL) will be (relatively) smaller, and therefore the minimum insertion loss (IL) may be easier to find, and an associated measurement and determination of the minimum insertion loss (IL) may be more accurate. Accordingly, in some examples, the minimum insertion loss (IL) value gathered from the swept wavelength system (SWS) described herein, such as the swept wavelength system (SWS) 200, 300, 400 may be utilized to determine a probabilistic assessment of uncertainty associated with a polarization dependent loss (PDL) of a device-under-test (DUT).

Figure 5:
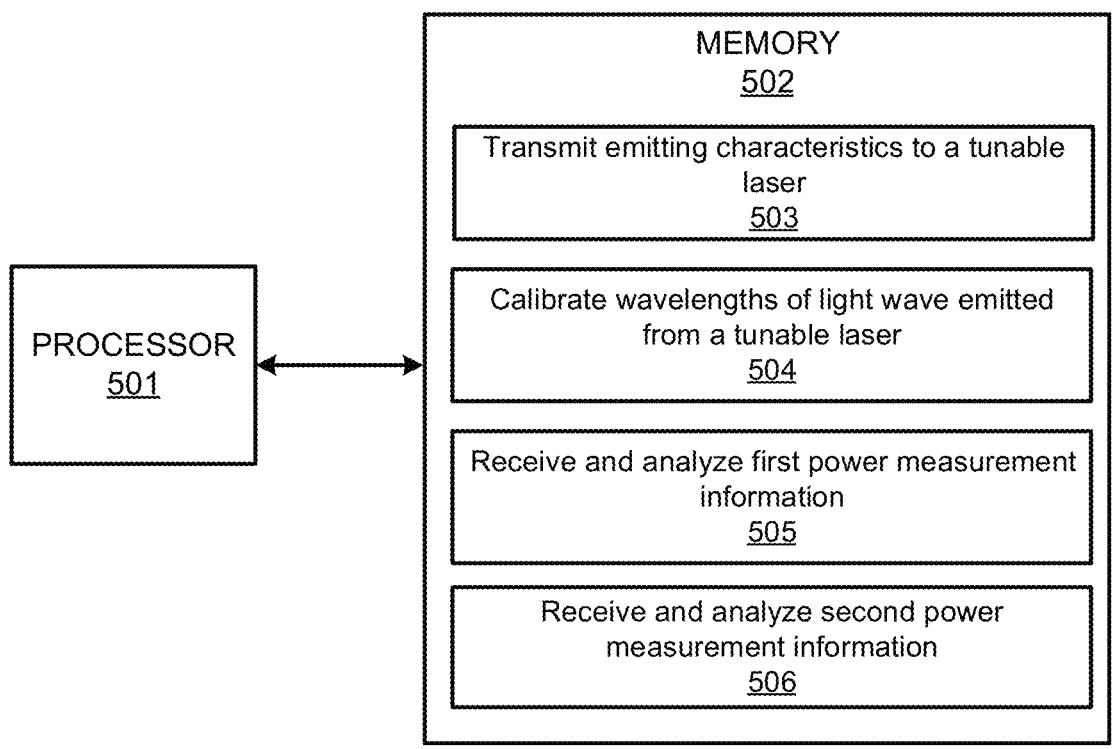
FIG. 5 illustrates a block diagram of a command and control component that may be implemented in a swept wavelength system (SWS), according to an example.

FIG. 5 illustrates a block diagram of a source optics component (SOC) 500 that may be implemented in a swept wavelength system (SWS) as described, according to an example. In some examples, the source optics component (SOC) 500 may be a device, while in other examples the source optics component (SOC) 500 may be a component within a device. In some examples, similar to the source optics components (SOCs) 201, 301 and 401 (shown in FIGS. 2, 3 and 4 respectively), the source optics component (SOC) 500 may be a command and control system for a swept wavelength system (SWS), and may implement various functionalities associated with a swept wavelength system (SWS). It should be appreciated that the source optics component (SOC) 500 may be provided as an example. Thus, the source optics component (SOC) 500 may or may not include additional features and some of the features described herein may be removed and/or modified without departing from the scope of the source optics component (SOC) 500 outlined herein.

As shown in FIG. 5, the source optics component (SOC) 500 may include processor 501 and the memory 502. In some examples, the processor 501 may execute the machine-readable instructions stored in the memory 502. It should be appreciated that the processor 501 may be a semiconductor-based microprocessor, a central processing unit (CPU), an application specific integrated circuit (ASIC), a field-programmable gate array (FPGA), and/or other suitable hardware device.

In some examples, the memory 502 may have stored thereon machine-readable instructions (which may also be termed computer-readable instructions) that the processor 501 may execute. The memory 502 may be an electronic, magnetic, optical, or other physical storage device that contains or stores executable instructions. The memory 502 may be, for example, Random Access memory (RAM), an Electrically Erasable Programmable Read-Only Memory (EEPROM), a storage device, an optical disc, or the like. The memory 502, which may also be referred to as a computer-readable storage medium, may be a non-transitory machine-readable storage medium, where the term "non-transitory" does not encompass transitory propagating signals. It should be appreciated that the memory 502 depicted in FIG. 5 may be provided as an example. Thus, the memory 502 may or may not include additional features, and some of the features described herein may be removed and/or modified without departing from the scope of the memory 502 outlined herein.

It should be appreciated that, and as described further below, the processing performed via the instructions on the memory 502 may or may not be performed, in part or in total, with the aid of other information and data. Moreover, and as described further below, it should be appreciated that the processing performed via the instructions on the memory 502 may or may not be performed, in part or in total, with the aid of or in addition to processing provided by other devices.

In some examples, and as discussed further below, the instructions 503-506 on the memory 502 may be executed alone or in combination by the processor 501 to implemented in a swept wavelength system (SWS) as described, according to an example. In some examples, the memory 502 may store instructions, which when executed by the processor 501, may cause the processor to: transmit 503 emitting characteristics to a tunable laser; calibrate 504 wavelength of an optical signal emitted from the tunable laser; receive and analyze 505 power measurement information associated with the optical signal and received via a polarization element; and receive and analyze 506 power measurement information associated with the optical signal and received via a device-under-test (DUT).

In some examples, the instructions 503 may transmit emitting characteristics to a tunable laser. That is, in some examples, the instructions 503 may implement, in a controlled manner, a wavelength of an optical signal emitted from the tunable laser (e.g., the tunable laser 202). In particular, the instructions 503 may implement the tunable laser to emit an optical signal that may continuously "sweep" across an optical band of interest at a constant rate.

In some examples, the instructions 504 may calibrate wavelengths of light wave emitted from a tunable laser. In some examples, emitting characteristics of the optical signal may be received from a wavelength reference and calibration component (e.g., the wavelength reference and calibration component 201a), which may enable calibration of wavelengths of light waves emitted from the tunable laser.

In some examples, the instructions 505 may receive and analyze first power measurement information associated with an optical signal received via a polarization element and a power reference and calibration component. In some examples, the instructions 505 may receive, measure and calibrate power information associated with an optical signal emitted from a tunable laser and transmitted via the polarization element (e.g., the polarization element 203) and the power reference and calibration component (e.g., the power reference and calibration component 204). In particular, the power measurement information may, among other things, measure power of the optical signal without (i.e., prior to) influence of a device-under-test (DUT).

In some examples, the instructions 506 may receive and analyze second power measurement information associated with an optical signal received via a device-under-test (DUT). In some examples, the instructions 506 may receive power measurement information from an optical signal transmitted from the tunable laser and transmitted via the polarization element, a device-under-test (DUT) and a power meter (e.g., the power meter 206). In particular, the measurement information received from the power meter may be utilized to take a power measurement for an optical signal scrambled by the polarization element and passed through the device-under-test (DUT).

Figure 6:
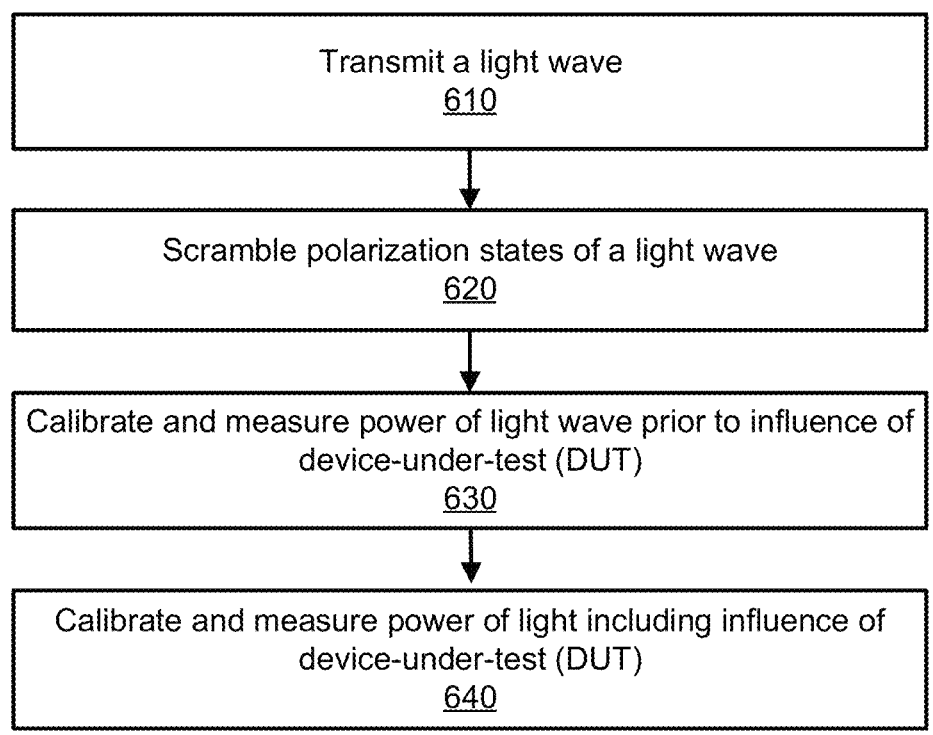
FIG. 6 illustrates a method for utilizing swept wavelength (SW) measurement techniques to acquire polarization dependent loss (PDL) of an optical component in a single scan, according to an example.

FIG. 6 illustrates a method 600 for utilizing swept wavelength (SW) measurement techniques to acquire polarization dependent loss (PDL) of an optical component in a single scan, according to an example. The method illustrated in FIG. 6 is provided by way of example, as there may be a variety of ways to carry out the method described herein. Each block shown in FIG. 6 may further represent one or more processes, methods, or subroutines, and one or more of the blocks may include machine-readable instructions stored on a non-transitory computer-readable medium and executed by a processor or other type of processing circuit to perform one or more operations described herein. Although the method 600 is primarily described as being performed by a swept wavelength system (SWS) 200 as shown in FIG. 2A, the method 600 may be executed or otherwise performed by other systems, or a combination of systems.

At 610, the tunable laser 202 may transmit an optical signal whose wavelength may be altered in a controlled manner to continuously "sweep" across an optical band (i.e., wavelength range) of interest at a constant rate and over an acquisition time. In some examples, the tunable laser may sweep across the optical band once.

At 620, the polarization element 203 may utilize a polarization controller to "scramble" (also "vary" or "modify") polarizations states of the optical signal (i.e., a laser) emitted from the tunable laser 202. In some examples, the polarization element 203 may vary polarization states within a particular range and over an acquisition time to include polarization states that may correspond to a maximum insertion loss (IL) and a minimum insertion loss (IL). In some examples, the maximum insertion loss (IL) and a minimum insertion loss (IL) may be used to calculate an average insertion (IL) and a polarization dependent loss (PDL) as well.

At 630, the processor 101 the power reference and calibration component 204 may be utilized to calibrate and measure power associated with an optical signal emitted from the tunable laser 202. In particular, upon being scrambled by the polarization element 203, the (scrambled) light wave may be received by the power reference and calibration component 204. The power reference and calibration component 204 may, among other things, measure power of the optical signal prior to (i.e., without) influence of the device-under-test (DUT) 205.

At 640, the power meter 206 may take a power measurement for an optical signal scrambled by the polarization element 203 and passed through the device-under-test (DUT) 205. In particular, upon passing through the device-under-test (DUT) 205, the optical signal may be transmitted to the power meter 206. In some examples, the power measurements gathered via the power reference and calibration component 204 (without the presence of the device-under-test (DUT) 205) may be compared to the power measurements gathered via the power meter 206 (via the device-under-test (DUT) 205), wherein these power measurements may be utilized to calibrate operations of the swept wavelength system (SWS) 200.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

The invention claimed is:

1. A system to measure polarization dependent loss (PDL) for a device-under-test (DUT), the system comprising:
    a tunable laser to emit an optical signal to sweep across an optical band at a constant rate and over an acquisition time;
    a polarization scrambler to scramble polarization states of the optical signal with respect to the sweeping of the tunable laser across the optical band, including varying exclusively between a plurality of orthogonal polarization states over a single sweep of the tunable laser and over the acquisition time, wherein each of the plurality of orthogonal polarization states is selected to correspond to a maximum insertion loss (IL) and a minimum IL associated with the DUT, and wherein the polarization scrambler relays the optical signal to the DUT; and
    a power meter to gather power measurements associated with the optical signal received from the DUT based on the single sweep of the tunable laser, wherein the power measurements are used to determine the maximum IL and the minimum IL associated with the DUT.

2. The system of claim 1, wherein the polarization scrambler scrambles the polarization states of the optical signal to enable capture of a maximum IL and a minimum IL for each polarization state in the optical band.

3. The system of claim 1, wherein the polarization scrambler includes a polarization controller to scramble the optical signal.

4. The system of claim 1, wherein the polarization scrambler includes a combination of high-order waveplates to scramble the optical signal.

5. The system of claim 1, wherein the plurality of orthogonal polarization states includes vertical (V), horizontal (H), 45-degree (D) and left-hand circular (L).

6. The system of claim 1, further comprising:
a power reference and calibration device to calibrate the power measurements associated with the optical signal.

7. The system of claim 6, wherein the polarization scrambler is located upstream of the power reference and calibration device.

8. The system of claim 6, further comprising:
a source optics component (SOC) to:
acquire and analyze measurement data from the tunable laser, the power reference and calibration device and the power meter; and
utilize the maximum IL and the minimum IL associated with the DUT to determine an average IL and a PDL associated with the DUT.

9. A method for measuring polarization dependent loss (PDL) for a device-under-test (DUT), the method comprising:
emitting, using a tunable laser, an optical signal to sweep across an optical band at a constant rate over an acquisition time;
scrambling, using a polarization scrambler, polarization states of the optical signal with respect to the sweeping of the tunable laser across the optical band, including varying exclusively between a plurality of orthogonal polarization states over a single sweep of the tunable laser and over the acquisition time, wherein each of the plurality of orthogonal polarization states is selected to correspond to a maximum IL and a minimum IL associated with the DUT, and wherein, wherein the polarization scrambler relays the optical signal to the DUT;
gathering power measurements associated with the optical signal received from the DUT based on the single sweep of the tunable laser;
determining a maximum insertion loss (IL) and a minimum insertion loss (IL) associated with the DUT using the power measurements; and
utilizing the maximum IL and the minimum IL associated with the DUT to determine an average IL and a PDL associated with the DUT.

10. The method of claim 9, further comprising capturing a maximum IL and a minimum IL for each scrambled polarization state of the scrambled polarization states.

11. The method of claim 9, wherein the scrambling the polarization states of the optical signal includes utilizing one of a polarization controller and a combination of high-order waveplates.

12. The method of claim 9, wherein the plurality of orthogonal polarization states includes vertical (V), horizontal (H), 45-degree (D) and left-hand circular (L).

13. The method of claim 9, wherein the polarization scrambler utilizes one of temporal scrambling and spectral scrambling.

14. The method claim 9, further comprising calibrating power measurements associated with the optical signal.

15. An apparatus to measure polarization dependent loss (PDL) for a device-under-test (DUT), the apparatus comprising:
a processor;
a memory storing instructions, which when executed by the processor, cause the processor to:
transmit emitting characteristics to a tunable laser to emit an optical signal to sweep across an optical band at a constant rate and over an acquisition time;
scramble polarization states of the optical signal with respect to the sweeping of the tunable laser across the optical band, including varying exclusively between a plurality of orthogonal polarization states over a single sweep of the tunable laser and over the acquisition time;
receive power measurement information associated with the optical signal based on the single sweep of the tunable laser;
analyze the power measurement information to determine a maximum IL and a minimum IL associated with the DUT, wherein each of the plurality of orthogonal polarization states is selected to correspond to a maximum IL and a minimum IL associated with the DUT; and
determine an average IL and a PDL associated with the DUT utilizing the maximum IL and the minimum IL associated with the DUT.

16. The apparatus of claim 15, wherein the memory storing instructions, when executed by the processor, further cause the processor to determine a difference between an intensity spectrum measured with and an intensity spectrum measured without a presence of the DUT.

17. The apparatus of claim 16, wherein the memory storing instructions, when executed by the processor, further cause the processor to utilize the maximum IL and the minimum IL associated with the DUT to determine an average IL and a PDL-associated with the DUT.

18. The apparatus of claim 16, wherein to scramble the polarization states of the optical signal, the memory storing instructions, when executed by the processor, further cause the processor to implement a combination of high-order waveplates.

19. The apparatus of claim 16, wherein the plurality of orthogonal polarization states includes vertical (V), horizontal (H), 45-degree (D) and left-hand circular (L).

20. The apparatus of claim 16, further comprising:
a detector element to process data associated with the power measurement information.

* * * * *